United States Patent Office 2,985,528
Patented May 23, 1961

2,985,528
METHOD OF PRODUCING METALS AND THEIR ALLOYS

Erich Fitzer, 91 Siemenstrasse, Meitingen, near Augsburg, Germany

No Drawing. Filed July 17, 1957, Ser. No. 672,372

1 Claim. (Cl. 75—84.1)

The present invention relates to a method of obtaining metals of the actinide series such as uranium, thorium, actinium, plutonium, etc., and their alloys, such as their alloys with aluminum, titanium, zirconium and other metals. It is known that these metals which have a great affinity for oxygen can be advantageously produced by the reduction of their halides. Thus for instance, uranium is obtained by reduction of the fluoride with calcium.

The actinide metals are valuable materials, the complete recovery of which in the reduction process is particularly important. Likewise, repeated remeltings for the production of homogeneous alloys should be circumvented as far as possible, in order to avoid slagging losses. Neither the first requirement as to complete recovery without losses of metal in the separation of the byproducts nor the second requirement for the production of alloys without repeated remelting can be satisfied by the customary methods of production. Thus, in particular, the difference in the specific gravities between the heavy actinides and for instance the light metals creates special metallurgical problems. The difficulty in finding highly refractory crucible materials which do not react during the melting with these metals with their affinity for oxygen and carbon is also well known.

The present invention describes a method in accordance with which these very problems are solved in a surprisingly simple manner. The invention is based on the experimental observation that the actinide metals can be bound in nascent state very rapidly and quantitatively to semi-metals present in excess if the latter are melted. It was even found that by this binding of the actinide metals in nascent state, the reduction of the actinide from their compounds is substantially facilitated since first of all the formation of the bond increases the chemical driving force of the reduction and secondly the actinides produced, due to the bonding to the semi-metal present in excess and which is melted, themselves behave like metal melts even at reduction temperatures below their melting point.

One essential feature of the present invention is the use of molten metals which are easily volatile under pressure. The separation of these metals from the actinides obtained can then be effected following a possible intermediate liquation known per se or filtration by distillation and thermal decomposition of the intermediate intermetallic compounds of the oxides which are formed and possibly also of their alloy metals with the readily volatile metals at lower pressure than the pressure of the formation of the metal or alloy. The carrying out of the reduction under pressure makes possible the use of high temperatures without losses of the readily volatile metals, the generally readily volatile halogen compounds and finally the also generally volatile reduction metals. There enter into question only temperature ranges above 350° C. The corresponding pressure in all cases establishes itself in the closed reaction vessels as a result of the vapor pressure of the aforementioned volatile components. Of course, it is possible, by barometric closure of the reaction vessel with the semi-metals cooled to slightly above the melting point to use simple pressure apparatus in the manner known per se.

It is now surprising that these semi-metals which by their spontaneous formation of alloys with the actinides show their great affinity for the latter can nevertheless be entirely separated thermally from them again. Thus it was possible to find that for instance mercury can be entirely removed from uranium-mercury compounds at 1050° C. and $10^{-2}$ mm. Hg column. Zinc could be separated up to the state of spectrum absence from thorium-zinc compounds by heating above 1400° C.

A further feature of the invention is the possibility of an alloying of the actinides with other metals during the binding to the readily volatile metals which these alloy metals contain in dissolved or suspended form. This possibility is of very particular advantage for alloying with light metals which, as already mentioned, are particularly difficult to produce in accordance with the customary methods. These alloy metals are not volatile upon the thermal separation of the semi-metal type and in this way it is possible to effect the direct production of the most varied alloy powders, for instance the direct production of all uranium-aluminum alloys without any comminution. These alloy powders are excellently suitable for powder metallurgy. This again is of advantage for the uranium-aluminum alloys already cited as example since as a result of the anisotropism of the expansion of uranium, they have much better dimensional stability upon alternating thermal treatment than cast alloys.

The selection of the semi-metal to be used in excess will depend in particular on its volatility and the melting or sintering properties of the actinide metals. Mercury, due to its easy volatility is of particular advantage for the obtaining of fine metallic and alloy powders. Depending on the volatilization temperature, very fine powders or a densely sintered sponge can be obtained. Finally the production of molten metal should not be excluded although in this case the advantages of the present process are not fully utilized.

In order to obtain elements which have a strong tendency toward nuclear decomposition, there is recommended the use of a semi-metal having a large neutron capture cross-section such as is available in cadmium, as is known. It has furthermore been found that particularly good operating conditions with practically 100% metal yield are obtained if the reduction is carried out and the actinide metal is bound to the molten semi-metal present in excess at temperatures as which the halides obtained as side product are also present in molten form and if the separation from these side products is effected before the separation of the readily volatile metal. In case of the reduction of chlorides, one will therefore for all practical purposes be in temperature ranges above 400° C. since the lowest melting eutectics of the alkali and the alkali earth chlorides lie in and above this region.

It has been found very advantageous to add to the reduction mixtures additions in the form of chlorides which reduce the melting point of the chloride obtained. When reducing with sodium, anhydrous magnesium chloride can for instance be added. This salt mixture can also be separated by liquation methods and the additive be recycled. The reduction metal can also be separated from the lower melting salt mixture in known manner by selective electrolysis and the residual electrolyte added to the circuit as addition agent. Finally it has been found that the reduction always takes place in a smooth rapid manner if the actinide halogen compounds which are to be reduced are present in molten form. This is generally possible under conditions of pressure reduction but difficulties can occur if it is desired to operate with mercury due to the high pressures.

On the other hand, the halides of the actinides tend to form low valent intermediate stages of high melting point in the case of an excess of reducing agent. It has now been surprisingly found that the formation of a solid, intermediate stage during the reduction does not lead to any decisive increase of the time of the reaction. This is in all probability due to the fine state of division of this solid, intermediate stage, since it is produced by partial reduction from the molten halide.

On this there is based a special embodiment of the method in accordance with the invention which will be explained in further detail using the $UCl_5$ reduction as example. This holohalide is reduced in a first stage at 750° C. at which temperature it is melted under pressure, partially approximately with 50% of the sodium required for the total reduction and zinc as excess semi-metal to form higher melting intermediate stages. These intermediate stages are present in finely divided form with the sodium chloride which is also solid. In the second stage calcium amalgam is now added. The further reduction takes place at 600° C. In this temperature range, the pressure of the mercury is about 15 atmospheres. During the course of the further reduction, there is formed as byproduct a $CaCl_2$-$NaCl$ eutectic of low melting point, while the uranium produced is absorbed entirely by the zinc-mercury melt as intermetallic compound and in this way is separated from the salt automatically and entirely quantitatively. This is a very important advantage of this new method in general. The resultant products are completely free of salt without further separation. The separation of the semi-metals then effected can be effected partially by distillation, jointly by decomposition.

Finally, it should also be particularly pointed out that the metals of halogen affinity required for the reduction can be added to the reduction in a simple manner, dissolved or suspended in the molten, readily volatile metal.

What is claimed is:

A method of preparing uranium comprising reducing anhydrous oxygen-free uranium pentachloride with sodium and zinc at about 750° C. and under super-atmospheric pressure, the amount of sodium being about 50% of that required for total reduction and the zinc constituting excess semi-metal to form higher melting intermediate stages then further reducing said chloride with calcium amalgam at about 600° C. under a pressure of about 15 atmospheres, whereby a calcium chloride-sodium chloride eutectic mixture and a zinc-mercury melt containing uranium dissolved therein are formed, and separating said uranium from said melt.

References Cited in the file of this patent

UNITED STATES PATENTS

| | | |
|---|---|---|
| 1,728,940 | Marden | Sept. 24, 1929 |
| 1,728,942 | Marden | Sept. 24, 1929 |
| 2,703,752 | Classer et al. | Mar. 8, 1955 |
| 2,782,116 | Spedding et al. | Feb. 19, 1957 |